No. 644,648. Patented Mar. 6, 1900.
C. G. TIEFEL.
BACK PEDALING BRAKE.
(Application filed Mar. 27, 1896. Renewed July 7, 1899.)
(No Model.) 2 Sheets—Sheet 1.
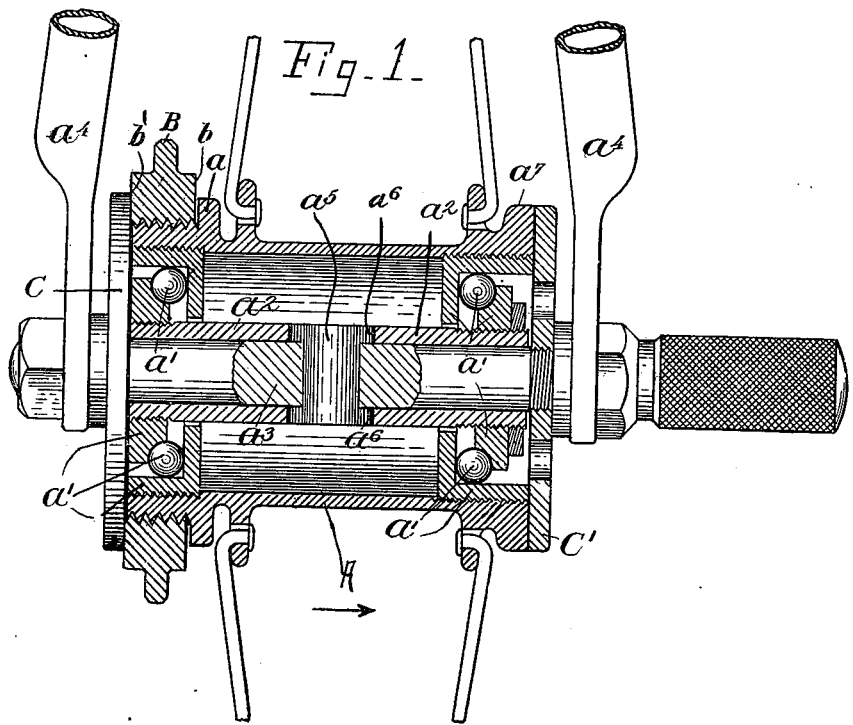
Witnesses.
A. R. Selden.
E. H. Marsellus.
Inventor.
Charles G. Tiefel
by
Howard L. Osgood
Attorney.

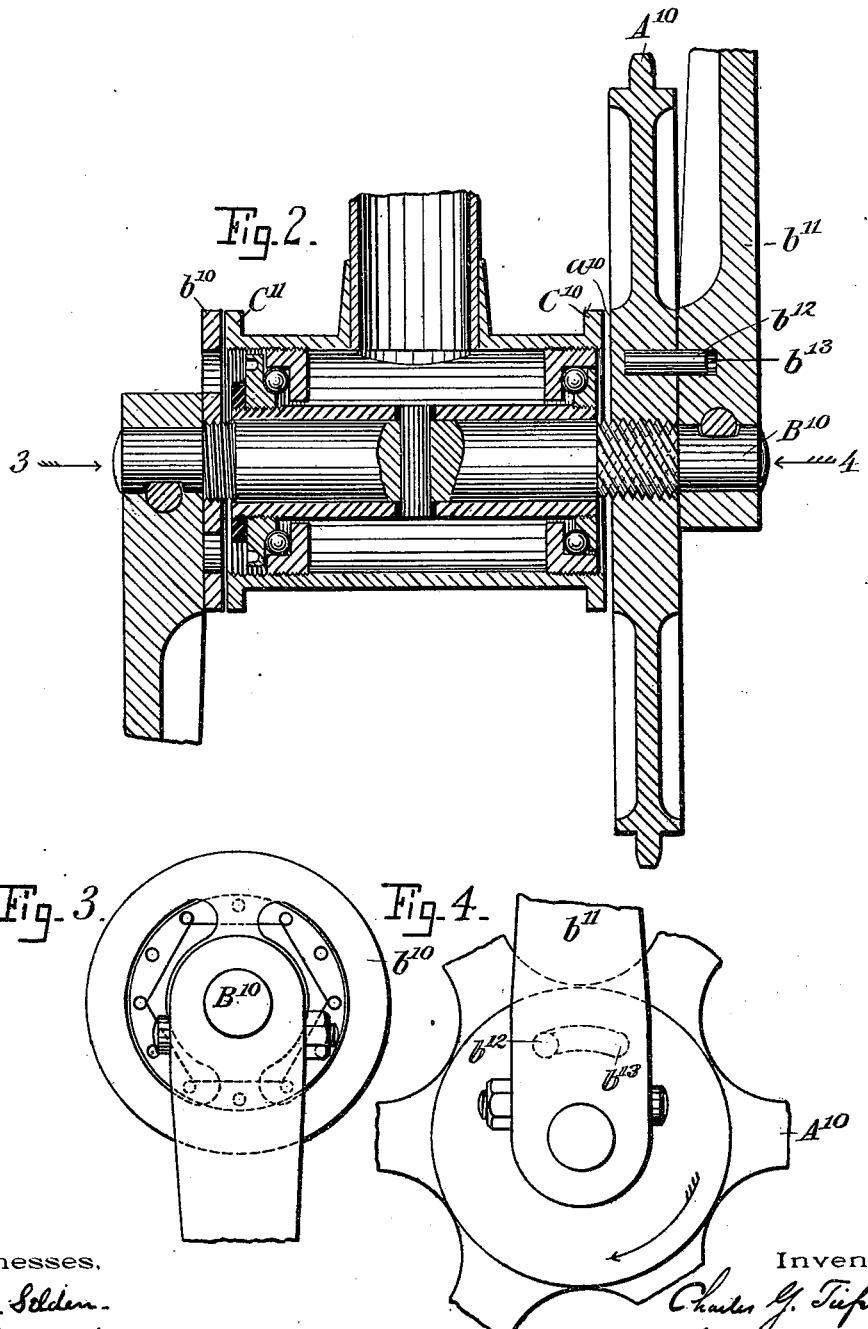

United States Patent Office.

CHARLES G. TIEFEL, OF ROCHESTER, NEW YORK, ASSIGNOR, BY MESNE ASSIGNMENTS, TO ROBERT H. CANFIELD, OF CORNING, NEW YORK.

BACK-PEDALING BRAKE.

SPECIFICATION forming part of Letters Patent No. 644,648, dated March 6, 1900.

Application filed March 27, 1896. Renewed July 7, 1899. Serial No. 723,114. (No model.)

*To all whom it may concern:*

Be it known that I, CHARLES G. TIEFEL, a citizen of the United States, and a resident of Rochester, county of Monroe, and State of New York, have invented certain new and useful Improvements in Vehicle-Brakes, of which the following is a specification, reference being had to the accompanying drawings, in which—

Figure 1 is a longitudinal section of my device applied to the rear or driving wheel of a bicycle. Fig. 2 is a similar section of said device applied to the driving-shaft of a bicycle. Figs. 3 and 4 are views of the opposite ends of the device seen in Fig. 2 looking, respectively, in the directions of the arrows marked 3 and 4 in Fig. 2, portions of the sprocket-wheel being omitted in Fig. 4.

The object of my invention is to produce a simple, practical, and effective vehicle-brake which may be controlled entirely by the feet of the rider, is put into operation by pressure upon the pedals such as is exerted in back-pedaling, operates without producing strain on the bearing for the wheel or shaft connected thereto, is released by forward pedaling, and does not interfere with the rotation of said wheel or shaft unless subjected to pressure like that of back-pedaling.

My invention consists in the devices and combinations hereinafter set forth and claimed.

In Fig. 1, A and B are respectively driven and driving members; $a$, an engaging part provided on the driven member; C, a brake member of the brake means of my invention, and $b$ $b'$ engaging parts for coöperating, respectively, with the engaging part $a$ and the brake member C.

The driven member A preferably consists of the hub of the driving-wheel of a vehicle, although it may consist of any other suitable revoluble part. Said driven member is mounted upon any desirable bearing, here illustrated as separated ball-bearings $a'$, interposed between the periphery of a non-revoluble sleeve $a^2$ and the inner face of the driven member. The ball-bearings $a'$ usually consist of cups screwing within the ends of the member A, cones screwing upon the ends of the sleeve $a^2$, and antifriction-balls interposed between adjacent surfaces of said cups and cones. The sleeve $a^2$ encircles a stationary axle $a^3$, having its opposite ends suitably fixed to the frame $a^4$ for the driven member A, is capable of a limited movement lengthwise of the axle $a^3$, and is prevented from revoluble movement independently of said axle by any desirable means, as a pin $a^5$, passed through the axle $a^3$ and having its opposite ends arranged in slots $a^6$, extending lengthwise of the sleeve $a^2$.

The driving member B is generally mounted on one end of the driven member A and is revoluble in reverse directions independently of said member A. The periphery of the member B is suitably formed for engaging a sprocket-chain or other driving mechanism, and the inner face of said member B is connected to the periphery of the adjacent portion of the driven member A by any desirable means, as by threads provided upon said inner face and periphery and actuated by the movement of the member B in reverse directions to move said member B laterally in opposite directions.

The engaging part $a$ preferably consists of a peripheral flange fixed to the driven member A and provided with an outer frictional engaging surface arranged at the inner side of the driving member B; but said engaging part may be formed separable from the member A, as will be obvious to one skilled in the art.

The brake member C of the brake means of my invention is usually sustained by the frame $a^4$ for the driven member A, is prevented from revoluble movement, and is arranged at the outer side of the driving member B. Said brake member is here illustrated as fixed to one end of the axle $a^3$, which is also illustrated as provided with a second brake member C', fixed to its opposite end, for making contact with the outer surface of an engaging part $a^7$, provided upon the adjacent surface of the driven member. The brake member C and the parts, as the axle $a^3$ and the brake member C', coöperating with said brake member C and the engaging part $b'$, presently described, to retard the movement of the driven member A form a particularly-effective brake means, which is provided with non-rotary engaging surfaces that transmit substantially-equal pressure in opposite directions, substantially lengthwise of the axis of the members A B, to the driven member A and the contiguous rotary surfaces of the members A B, and thus operate to retard the revolution of the driven member A without producing strain on the bearing for the driven member or longitudinal strain on said driven member in one direction only.

The engaging parts $b\ b'$ are actuated by the movement of the driving member B relatively to the member A, are preferably formed integral with opposite sides of said driving member, and are respectively movable laterally into and out of engagement with the engaging part $a$ and the brake member C as the member B is moved in reverse direction. When the engaging part $b$ is engaged with the part $a$, the driven member A is locked to the driving member B, and when the part $b'$ is engaged with the brake member C the rotation of the member A is retarded and if sufficient pressure is exerted may be stopped entirely. The outer sides of the engaging parts $b\ b'$ thus form frictional engaging surfaces which are arranged between the inner or brake surfaces of the members C C' of my brake means and are movable from each other by the backward movement of the driving member into position to coöperate with said brake-surfaces to retard the revolution of the driven member A. The engaging parts $b\ b'$, although preferably formed integral with the driving member B, as described, may be formed separable from said member, as will be obvious to one skilled in the art.

In Figs. 2, 3, and 4, $A^{10}\ B^{10}$ are respectively driven and driving members, $a^{10}$ is an engaging part provided on the driven member, $C^{10}\ C^{11}$ are fixed brake members, and $b^{10}$ is an engaging part fixed to the driving member $B^{10}$ and coöperating with the brake member $C^{11}$. In this exemplification of my invention the driven member is a sprocket-wheel arranged at one side of the brake member $C^{10}$, and the driving member is a driving-axle passed through the driven member and having a portion of its periphery provided with threads interlocking with like threads on the inner face of the driven member. One end of the driving member is provided with a crank $b^{11}$, arranged adjacent to the outer face of the driven member, and the opposite end of said driving member is also provided with a crank and is suitably fixed to the engaging part $b^{10}$. The crank $b^{11}$ is usually connected to the driven member by a pin $b^{12}$, having one end movable in a slot $b^{13}$ in said crank and its opposite end fixed to the hub of the driven member. As the driving and driven members are rotated rearwardly the engaging part $a^{10}$ presses against the brake member $C^{10}$, the driving member is drawn endwise, and the engaging part $b^{10}$ is forced against the brake member $C^{11}$, thus creating a pressure which tends to prevent turning of the driven member.

The construction and operation of my vehicle-brake will now be readily understood upon reference to the foregoing description and the accompanying drawings, and it will be obvious to one skilled in the art that more or less change may be made in the component parts of said brake without departing from the spirit of my invention.

Having thus fully described my invention, what I claim as new, and desire to secure by Letters Patent, is—

1. In a vehicle-brake, the combination with two revoluble members, one being movable relatively to the other, a bearing for one of the revoluble members, two rotary and two non-rotary engaging surfaces for transmitting substantially-equal pressure to one of the revoluble members in opposite directions substantially lengthwise of its axis and thereby retarding the revolution of said one of the revoluble members without transmitting pressure to the bearing, and means for locking the revoluble members together and for operatively engaging said surfaces, substantially as and for the purpose described.

2. In a vehicle-brake, the combination of revoluble driven and driving members, one being movable relatively to the other, and two revoluble and two non-revoluble engaging surfaces for transmitting substantially-equal pressure to the driven member in opposite directions substantially lengthwise of its axis, and means for locking the revoluble members together and for operatively engaging said surfaces, substantially as and for the purpose specified.

3. In a vehicle-brake, the combination with two revoluble members, one being movable relatively to the other, two rotary and two non-rotary engaging surfaces, two of said surfaces transmitting substantially-equal pressure to the other two of said surfaces substantially lengthwise of the axis of the revoluble members in opposite directions, and means for locking the revoluble members together and for engaging said surfaces, substantially as and for the purpose set forth.

CHARLES G. TIEFEL.

Witnesses:
  E. H. MARSELLUS,
  LUTHER ROBBINS.